Dec. 11, 1934.　　　　F. HOTCHNER　　　　1,984,215
VACUUM VESSEL AND ILLUMINATING DEVICE
Filed Jan. 16, 1931　　　4 Sheets-Sheet 1
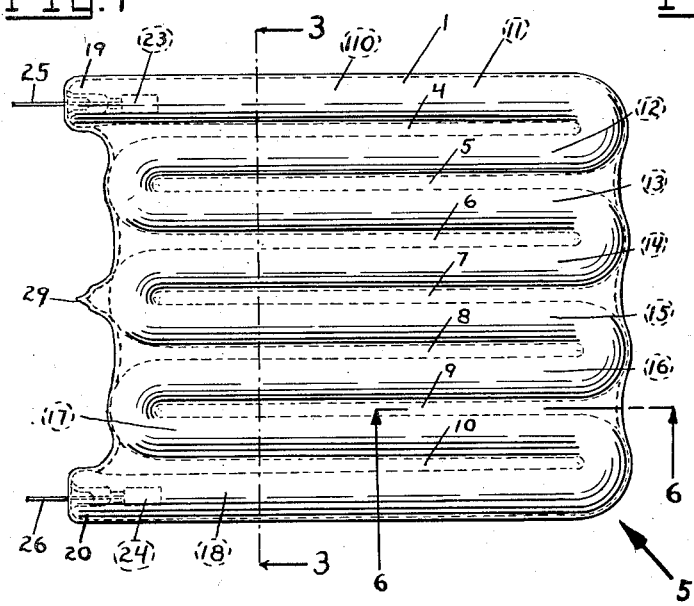
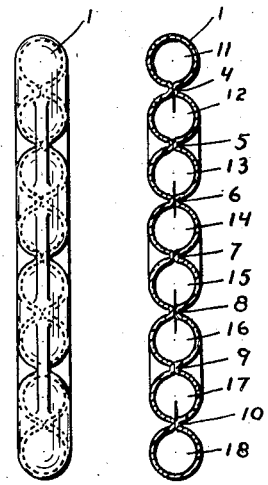
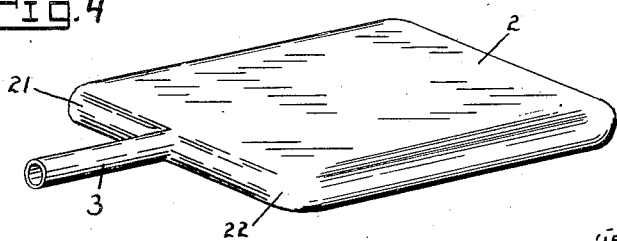
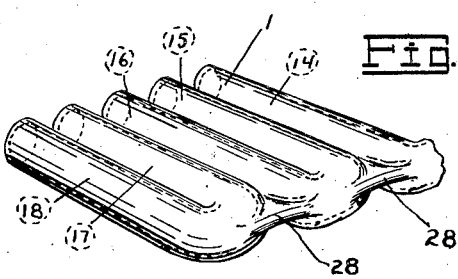
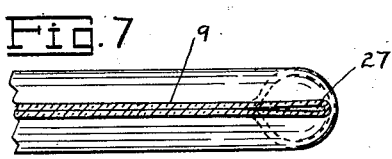
INVENTOR
Fred Hotchner

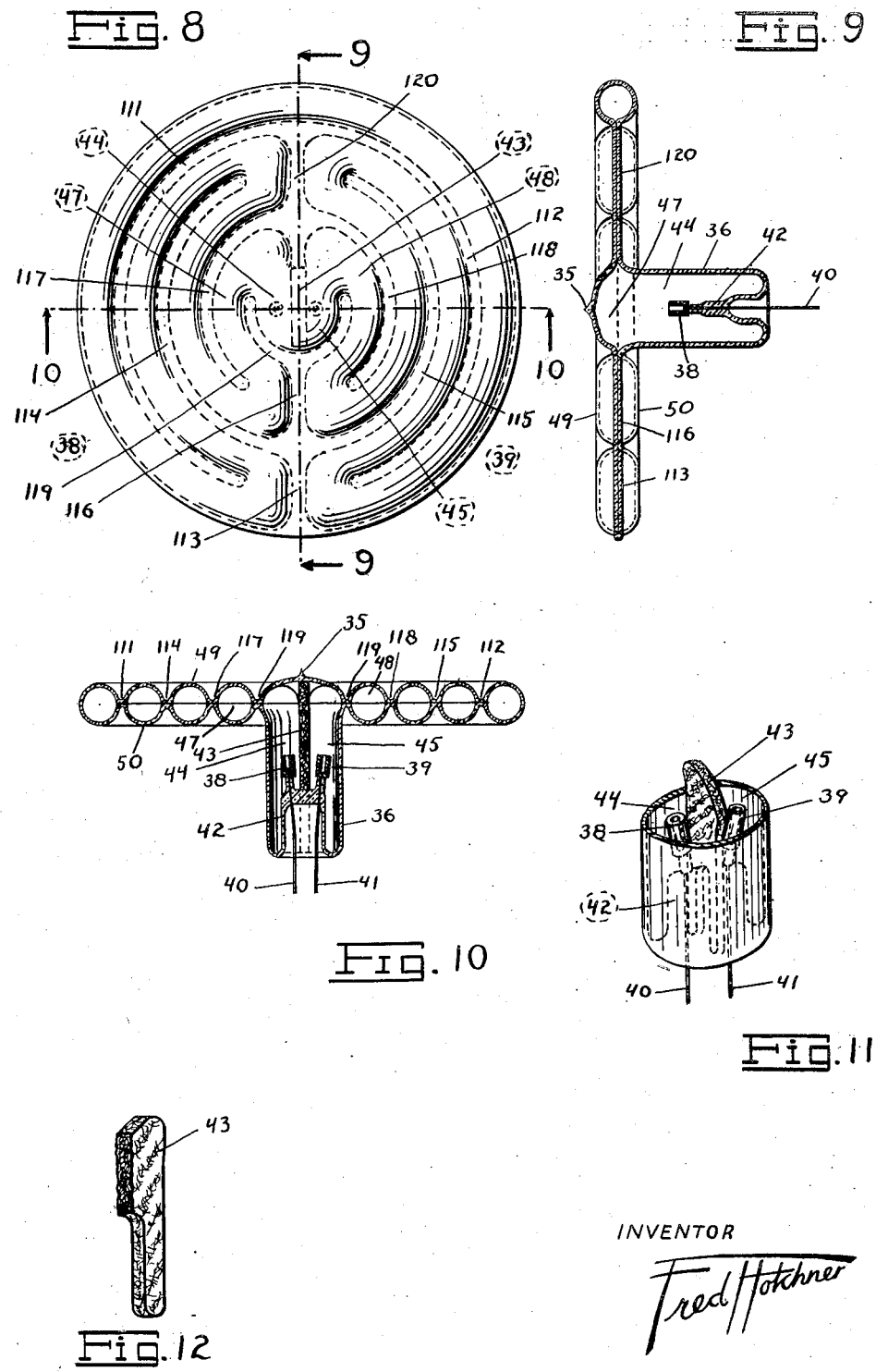

Dec. 11, 1934.    F. HOTCHNER    1,984,215
VACUUM VESSEL AND ILLUMINATING DEVICE
Filed Jan. 16, 1931    4 Sheets-Sheet 3
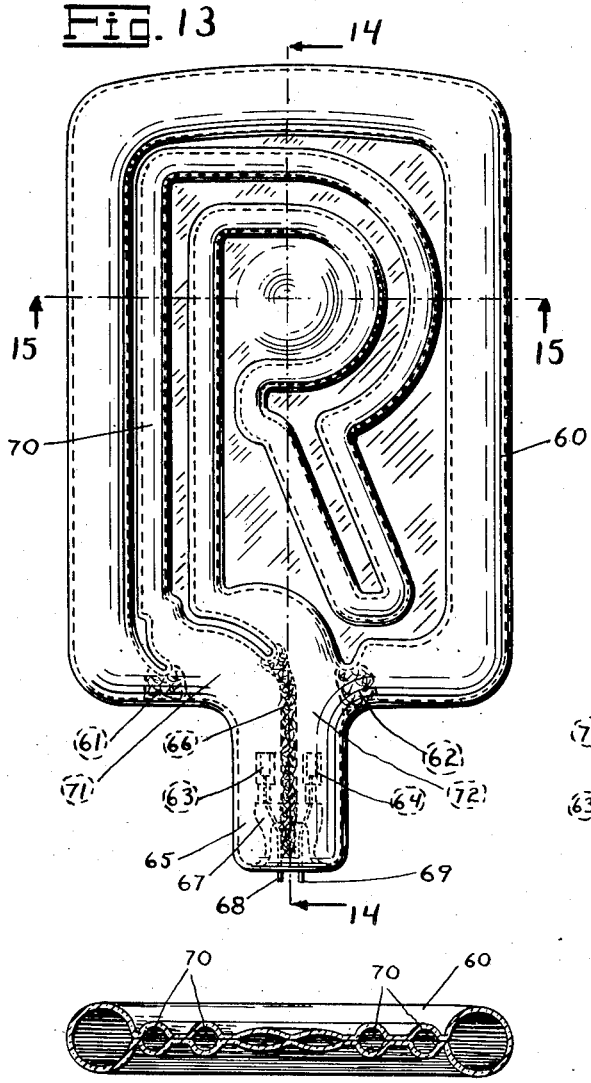
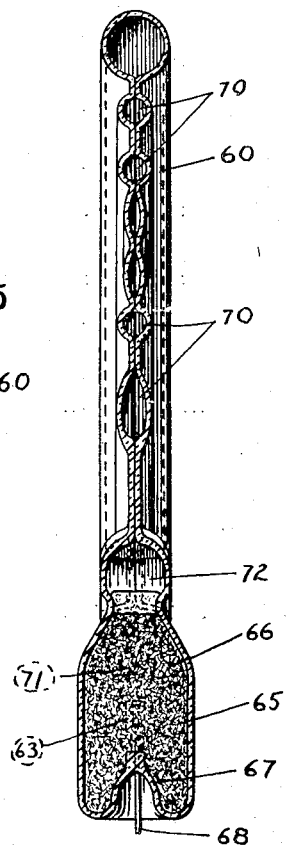
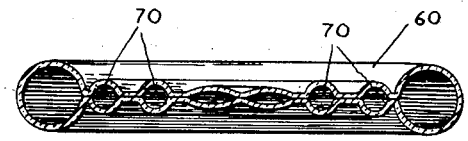
INVENTOR
Fred Hotchner Dec. 11, 1934.    F. HOTCHNER    1,984,215
VACUUM VESSEL AND ILLUMINATING DEVICE
Filed Jan. 16, 1931    4 Sheets-Sheet 4
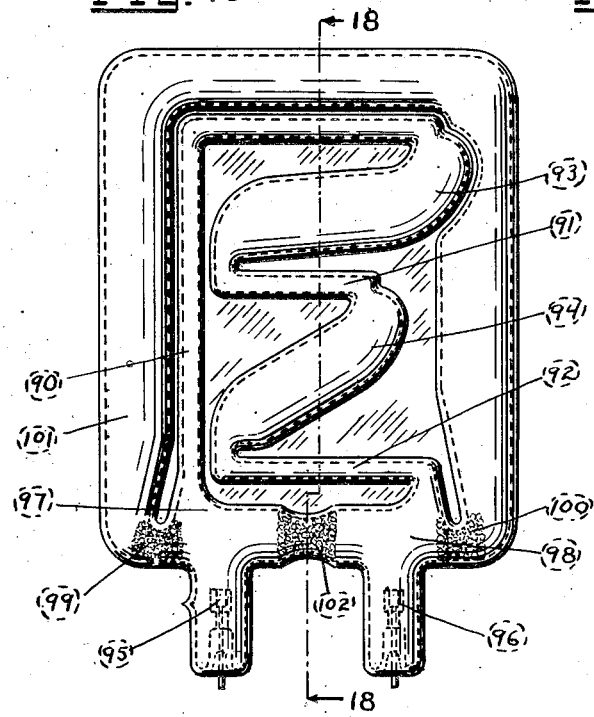
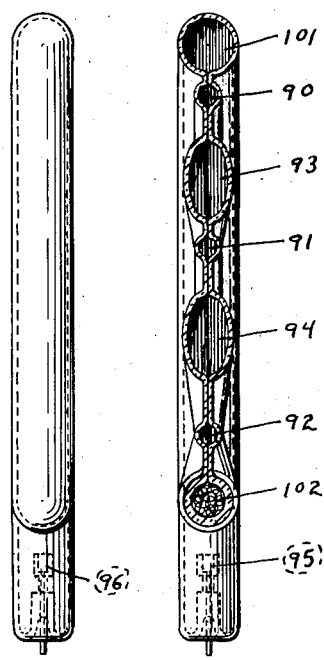
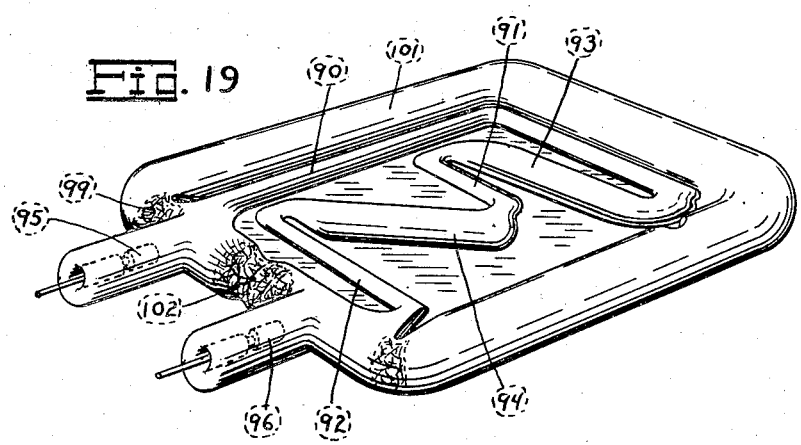
INVENTOR
Fred Hotchner Patented Dec. 11, 1934

1,984,215

UNITED STATES PATENT OFFICE 1,984,215

VACUUM VESSEL AND ILLUMINATING DEVICE

Fred Hotchner, Los Angeles, Calif.

Application January 16, 1931, Serial No. 509,253

10 Claims. (Cl. 176—14)

This invention relates to a vacuum vessel having a generally flattened form. Several embodiments of the invention are shown in the form of illuminating devices in which radiation is generated by electric conduction through a gaseous medium within the vessel. These devices are shown for purposes of illustration, it being understood that the new features herein disclosed may be utilized in numerous types of vacuum vessels. The process of forming these vessels is disclosed in my Patent No. 1,867,154, dated July 12, 1932.

An object of the invention is to provide a vessel having a generally flattened form capable of resisting the pressure of the atmosphere when a vacuum is drawn therewithin without providing thick walls to resist the atmosphere over an appreciable percentage of the total area thereof.

It is contemplated that the walls of these devices may be as thin as the walls of incandescent lamps. In the prior art, vacuum vessels have been made having thin walls but in most cases the general shape was that of a solid of revolution in which all portions of the walls were arched, so that the pressure of the atmosphere is resisted by compression in the walls themselves rather than by shear. Where any considerable extent of the walls is flattened, the atmospheric pressure naturally tends to press the same in and while devices are known in which flat walls are provided, these walls are in all such cases made very thick to resist atmospheric pressure by shear.

In the preferred form of the present invention, it is provided that portions of the opposing walls are so formed as to come in contact with each other when the device is finished and that the remaining portions are of generally arched form thereby translating atmospheric pressure into compression in such arched portions and balancing the pressures between opposite sides at said contacting portions.

In the fabrication of vessels of vitreous material, it is preferred that the opposing portions be not fused together in order that stresses from contraction and expansion will not crack the glass. However, in the embodiments of the invention shown, the passages formed within the device by the pinching together of the opposing walls must be isolated from each other, insofar as the passage of a discharge through a gaseous medium is concerned, and therefore they must approach each other so closely that, were the device made by the usual method, the walls would stick together and crack up upon cooling. Therefore it is provided in fabricating this device, that the approaching portions of the opposing walls do not actually touch each other while the glass is hot, but are separated by a very small space sufficient to prevent actual contact during fabrication, but still so small that the pressure of the atmosphere suffices to bring them together when the device is evacuated and charged with gas at a low pressure. The opposing walls are so formed that the contacting of opposing ridges forms a discharge passage through the device. The process of fabricating these devices is disclosed in my Patent No. 1,867,154.

An object of this invention is to provide an illuminating device of the general character illustrated, formed from a single bulb of vitreous material.

A further object is to provide a gaseous conductor discharge device having an extended passage therethrough formed by the pressing together of portions of opposing walls thereof.

A further object is to provide a gaseous conductor discharge device having a tortuous passage therethrough which may be fabricated in a very simple manner and which will, upon being evacuated, close together as regards the spacing of the opposing walls, thereby improving the seal between the various portions of the passage.

A further object of the invention is to provide a new and novel method of sealing different regions of a gaseous conductor device from each other.

Another object is to provide an electrode terminal for a gaseous conductor lamp in which both electrodes are made in the same terminal chamber and are isolated from each other by simple means inserted before completing the lamp.

A further object is to provide a tubeless gaseous conductor sign in which characters are formed without "return bend" portions. That is to say, all of the portions of the passage from one terminal to the other lie virtually in a single plane, those portions which are not of the character proper being rendered comparatively nonluminous by means set forth below.

Another object of the invention is to provide a device of the type described having a reservoir for reserve gas.

Another object of the invention is to provide a display character in which the minimum amount of energy is consumed in the portions of the discharge path not necessary for the character proper.

Another object is to provide a display character formed by the pressing together of opposing walls having a round frame-like effect completely surrounding the character for the purpose of enhancing the appearance thereof.

Further objects of the invention will be apparent from the following specification and the accompanying drawings.

In the drawings:

Fig. 1 is a plan of a grid-like gaseous conductor illuminating device made according to the invention.

Fig. 2 is an end elevation of the same.

Fig. 3 is a cross section through the device shown in Fig. 1, taken on the line 3—3 of Fig. 1.

Fig. 4 is a perspective view of the blank shown in Fig. 1 from which the device has been fabricated.

Fig. 5 is a perspective view of a corner of the device shown in Fig. 1 in the direction of the arrow 5 in Fig. 1.

Fig. 6 is a section through the device taken on the line 6—6 of Fig. 1, showing the condition of the walls of the vessel after the same are fabricated, and before the device has been pumped.

Fig. 7 is the same section showing the condition of the walls of the vessel after the same has been pumped.

Figs. 8, 9, 10, 11 and 12 illustrate a variation of the invention, showing a grid-like illuminating device in which both terminals are provided in a single enclosure. In this embodiment, a new type of terminal construction is shown. Fig. 8 is a plan view, Fig. 9 is a section taken on the line 9—9 of Fig. 8, Fig. 10 is a section taken on the line 10—10 of Fig. 8, and Fig. 11 is a perspective view of the terminal portion disconnected from the device, and Fig. 12 is a view of a portion of the flexible baffle used to separate the two electrodes and direct the discharge into the passage.

Figs. 13, 14 and 15 illustrate another variation of the invention in which a double outline luminous letter is formed in a flattened vessel made according to this invention.

Figs. 16, 17, 18 and 19 illustrate another embodiment of the invention in which a single outline luminous sign letter is provided in a flattened vessel made according to this invention.

Referring now to the drawings, numeral 1, Fig. 1, indicates a finished vessel made according to this invention, formed by the pressing together of the opposite walls of a partly completed vessel indicated by numeral 2 in Fig. 4. The vessel 2 in Fig. 4 is provided with a tube 3 by means of which air pressure is applied to blow it into a suitable die, as set forth in my Patent No. 1,867,154 above referred to, the pinched together portions, 4, 5, 6, 7, 8, 9 and 10 in the completed vessel serving to isolate the separate legs of the tortuous grid-like passage from each other, the passage being indicated by 110 and the various sections of the same by 11, 12, 13, 14, 15, 16, 17 and 18. The electrode terminals 19 and 20 are then sealed in place by first blowing out the portions indicated by 21 and 22 on the blank shown in Fig. 2, it being understood that these portions are not blown out until after the walls are pressed together, the usual type of internal discharge electrode being used, indicated by 23 and 24 having lead-in conductors 25 and 26. The opposing walls of the vessel are pressed together preferably without touching but so close that upon the drawing of a vacuum within said passage, they come together and touch with sufficient area of contact to isolate the different legs of the discharge passage from each other. It is to be noticed at 27 in Fig. 7 that the opposing parts of the wall will not come as close together at the places such as 28 in Fig. 5 as they do in other places since the "leakage passage" being longer at such places, compensates for the failure to completely close. The device is sealed off as indicated by 29 in Fig. 1 after it is pumped and processed by known methods and provided with a suitable ionization conductor.

Referring now to the variation of the invention as shown in Figs. 8 to 12, I have here provided for placing both electrode terminals in a single enclosure. The general method of fabricating this device is the same as that in the preceding illustration, the tubulation being indicated as at 35 and the tube 36 being provided for the electrode chamber. The electrodes 38 and 39 are secured to the lead-in conductors 40 and 41 which are sealed in the reentrant stem 42. The flexible baffle 43 of glass wool or similar flexible dielectric material, is provided to isolate the two electrodes from each other.

It will be noticed in Fig. 8 that this baffle 43 isolates the two portions 44 and 45 of the chamber 36 in the tube from each other, thereby directing the discharge into the channels 47 and 48, the passage between the two electrodes thus including the entire grid formed by the pressing together of portions of the opposite walls 49 and 50 as indicated by 111, 112, 113, 114, 115, 116, 117, 118, 119 and 120. In this instance also it is preferred that the portions of the opposing walls that are pressed together be pressed so closely that upon the drawing of a vacuum, they will virtually touch but still will not stick together when the glass is hot.

Figs. 13, 14 and 15 show a sign character vessel in which a double outline letter is provided in a flat device. Around the edge of the device is a rolled chamber 60 which, while not participating as a passageway for the discharge, nevertheless serves as a strengthening rim and also enhances the appearance of the vessel, as well as providing a reserve chamber for gas. This passageway is blocked off by baffles of flexible material, such as glass wool indicated by 61 and 62, and the two electrodes 63 and 64 in the enclosure 65 are isolated from each other by the baffle 66, this device having a reentrant stem 67 and two lead-in conductors 68 and 69, as in the prior illustration. It will be seen that the passageway 70 forming the letter "R" terminates in the passages 71 and 72 leading to the chambers enclosing the electrodes. The cross sectional area of these passages is considerably greater than that of the passageway 70 in order that the discharge in the passages 71 and 72 may be virtually non-luminous as compared with the discharge in the passageway 70. The object of this feature is fully described in a previously filed co-pending application of mine. The chamber 60 in this device serves as a gas reservoir, the baffles 61, 62 and 66 being pervious to gas but not to the discharge.

In the device shown in Figs. 16 to 19, a flat single outline letter character is shown, in this case the letter "E" which is formed by the passages 90, 91 and 92, which are connected together by the enlarged passageways 93 and 94 and communicate with the electrodes 95 and 96 through the enlarged passageways 97 and 98. This construction provides in a single plane all of the passageways for any letter or character, thereby eliminating the doubled-back portions of the prior art devices, being an important and useful device in the art. The baffles 99 and 100 are positioned to isolate the chamber 101 from the discharge passage and the baffle 102 isolates the two electrodes from each other.

It is to be understood in the above description that it is preferred that the opposing portions of the walls coming together to define the passageway should when the device is completed substantially touch over their entire length but due to the behavior of discharges, this is not always necessary as a certain amount of clearance may exist and the discharge would still fill the passageway in preference to leaking through between contacting portions of the opposing walls so therefor in speaking of contacting portions in the claims, it is to be understood that this refers to those portions approaching each other to such a degree as to substantially prevent a discharge leaking therebetween, whether or not actual physical contact exists.

It will be noticed that in the enlarged sections of the passageway the resistance will be relatively low because of the increased cross-sectional area. Also, the total length of the passageway will in most cases not be as great as it would be were the method of the prior art used in making return bends over portions of the passageway that are illuminated.

By the term "vacuum vessel" I have reference to any envelope having lower fluid pressure in the inside than atmospheric and this term includes such devices as thermos bottles, heat insulating units, and all similar devices as well as lighting devices.

By the term "illuminating device" I have reference to any gaseous conductor device in which radiation is generated by the passage of current through the same, whether such device is for illuminating purposes, advertising display, therapeutics or any other application of radiation, and also includes devices in which radiation not visible to the eye is generated within the purview of any of the features of the invention.

It is to be understood in speaking of the arched portions of the walls of the device that it is not essential that these portions follow any definite curve as in some cases a certain amount of shear may be allowed in the walls.

It is also to be understood that the drawings show the walls thicker than might ordinarily be used commercially, for purposes of illustration but that the invention is not limited to any particular thickness of wall except in such claims where such limitation is made.

In the claims the expression "display pattern" is to be understood as including any pattern of inscriptions, characters, figures, numerals, symbols, ornaments, designs, borders or signs, whether including but one of any of such devices, or a number of any one of such devices or any combination of such devices when used as an intended visible portion of the display according to this invention or as referring to the elements of said device when in any of such forms.

It is to be understood that the various features of the invention may be practiced singly or in different combinations and except where so limited in the claims, the invention includes vessels having walls of thick material from either of which protuberances may extend toward the other wall as contrasted with the thin walls illustrated and in certain cases also includes vessels in which inserts are placed between the walls for accomplishing certain purposes.

By the term "evacuated" as used in the claims I have reference to that condition in which the fluid pressure on the inside of the device is considerably lower than normal atmospheric pressure.

The invention is not limited by any particular embodiments illustrated but only by the prior art and the appended claims.

I claim:

1. A vacuum vessel comprising an envelope of resilient vitreous material having a pair of extended spaced walls one of which is of such extent and thinness as to be responsive to pressure of the atmosphere, said wall being provided with a formation intermediate of its edges extending inwardly toward and touching the other wall under unbalanced pressure of the atmosphere, a portion of the atmospheric pressure on said walls being thus neutralized.

2. A vacuous vessel comprising an envelope of resilient vitreous material having a pair of extended spaced walls of such extent and thinness of material as to be responsive to pressure of the atmosphere, said walls having portions intermediate the edges thereof outwardly arched with inwardly extending portions of the said walls touching and bearing against each other under the unbalanced pressure of the atmosphere on said walls, said arched portions being of such form as to translate shearing stresses into compressive stresses and to deliver them at the regions of contact between the said walls.

3. A vacuum electric or gaseous discharge device comprising an envelope of resilient vitreous material having a pair of extended spaced walls at least one of which is provided with a formation extending inwardly toward the other wall and touching the same under the unbalanced pressure of the atmosphere, said formation thus defining a discharge passage between said walls of shape other than that of the envelope itself, a gaseous medium in said passage at a low pressure and means to pass current therethrough.

4. A vacuum electric or gaseous discharge device comprising an envelope of resilient vitreous material having a pair of extended spaced walls at least one of which is provided with a ridged formation extending inwardly toward and touching the other wall under the unbalanced pressure of the atmosphere and defining a tortuous discharge passage between said walls, a gaseous medium at a low pressure in said passage and means to pass current therethrough.

5. A vacuum electric or gaseous discharge device comprising an envelope of resilient vitreous material having a pair of extended spaced walls each of which includes outwardly extending arched portions between parallel inwardly extending ridge portions, the arches and ridges in the said walls complementing each other and defining a tortuous discharge passage between said walls, said opposing ridges being held in contact with each other by the unbalanced pressure of the atmosphere, a gaseous medium at a low pressure in said passage and means to pass current therethrough.

6. A vacuum electric or gaseous discharge device comprising an evacuated envelope having extended spaced walls of vitreous material, said walls having inwardly depressed portions forming parallel ridges enclosing a tortuous passage therebetween within said envelope and leaving an additional chambered space serving as a reserve gas space, a gaseous medium in said envelope and means to pass current through said tortuous passage.

7. A vacuum electric or gaseous discharge device comprising an evacuated envelope having a pair of extended spaced walls provided with inwardly extending formations partially defining a tortuous passageway therebetween, an electrode chamber into which both ends of said passage open, a pair of electrodes in said chamber and a barrier member of resilient discharge stopping material positioned therein isolating the portion of said chamber enclosing one of said electrodes with one end of said passageway and the portion of said chamber enclosing the other of said electrodes with the other end of said passageway from each other.

8. A luminescent device comprising an evacuated envelope including a pair of extended spaced walls of thin resilient vitreous material the major surfaces of which are divided into a group of portions of outwardly arching form and a plurality of inwardly extending portions between the arches the innermost portions of which on each wall touch like portions on the opposing wall and are held thereagainst by the unbalanced pressure of the atmosphere on the outside of said device, a group of said arches defining a tortuous discharge passage between said walls, a gaseous conducting medium at a low pressure therewithin and means to pass current through said discharge passage.

9. A luminescent device comprising an evacuated envelope including a pair of extended spaced walls of thin resilient vitreous material the major surfaces of which are divided into a group of portions of outwardly arching form and a plurality of inwardly extending portions between the arches the innermost portions of which on each wall touch like portions on the opposing wall and are held thereagainst by the unbalanced pressure of the atmosphere on the outside of said envelope, a group of said arches joining to provide a single continuous discharge passageway between said walls defining a character incapable of being defined by a single line without crossing over itself or returning over its own course, said passageway including a plurality of portions definitive of portions of said character, and another group of portions not included in said character outline and of enlarged cross sectional area, all of said portions forming one continuous passageway not crossing over itself and not returning over its own course, a gaseous conducting medium at a low pressure therein and means to pass current therethrough.

10. A gaseous conduction device consisting of an evacuated envelope containing a gaseous conductor at a low pressure and having a pair of spaced extended walls of vitreous material provided with inwardly extending formations and a barrier member of resilient discharge stopping material positioned between said walls, said formations and said barrier member cooperating to define a tortuous discharge passage between said walls, and means to pass current through said passage.

FRED HOTCHNER.